United States Patent [19]

Eidinger et al.

[11] 4,266,258

[45] May 5, 1981

[54] CURRENT LIMITING DEVICE FOR HIGH VOLTAGE SWITCHING MECHANISMS

[75] Inventors: Adolf Eidinger, Nussbaumen; Carl D. Flössel, Fislisbach; Georg Köppl, Birr; Alfred Ulrich, Döttingen; Hans Schibli, Bremgarten, all of Switzerland

[73] Assignee: BBC Brown, Boveri & Co. Ltd., Baden, Switzerland

[21] Appl. No.: 36,700

[22] Filed: May 7, 1979

[30] Foreign Application Priority Data

Jan. 25, 1979 [CH] Switzerland .......................... 734/79

[51] Int. Cl.[3] .............................................. H02H 7/22

[52] U.S. Cl. ....................................... 361/58; 361/71; 361/104

[58] Field of Search ..................... 361/58, 71, 74, 104; 337/401

[56] References Cited

U.S. PATENT DOCUMENTS 4,176,385 11/1979 Dethlefsen ............................ 361/58

FOREIGN PATENT DOCUMENTS 1141015 12/1955 Fed. Rep. of Germany ........... 361/104

1904244 8/1970 Fed. Rep. of Germany ........... 337/401

OTHER PUBLICATIONS

"Ultra-High Speed Protection Device"-Miyoshi et al., Fuji Electric Review, vol. 18, No. 1, pp. 49-51, 1972.

*Primary Examiner*—Harry E. Moose, Jr.

*Attorney, Agent, or Firm*—Burns, Doane, Swecker & Mathis

[57] ABSTRACT

A device for quickly reconnecting two portions of a current carrying line after separation of the line portions through actuation of a circuit breaker includes a second circuit breaker and a serially connected switch connected in parallel with a primary circuit breaker. Closure of the switch reconnects the line portions through the second circuit breaker after actuation of the primary circuit breaker. The switch can include auxiliary contacts for supplying power to an ignition device associated with the second circuit breaker, to render the second circuit breaker operable only when the switch is closed.

4 Claims, 5 Drawing Figures

CURRENT LIMITING DEVICE FOR HIGH VOLTAGE SWITCHING MECHANISMS

BACKGROUND OF THE INVENTION

The present invention relates to a current-limiting device for high voltage switching mechanisms having a fast acting circuit breaker for limiting and interrupting short-circuit currents. In the circuit breaker, an explosive charge is ignited to break an explosive conductor and the resulting arc voltage commutates the current to be limited to a fusible conductor connected in parallel with the explosive conductor wherein the current is quickly interrupted and thereby limited.

Fast acting circuit breakers of the type described which can be used as current-limiting device are disclosed, for example, in West German Pat. Nos. 1,056,249 and 1,169,019. They are suitable for use both with direct and alternating currents. Their switching times generally range from ten to one hundred times less than the switching times of other circuit breakers of conventional design. The time for extinguishing the current in the event of a short-circuit is typically less than 0.5 msec. It is thereby possible to keep the short-circuit current so small in alternating current power lines of conventional frequency that the electrical switching mechanisms and associated equipment no longer need to be rated for the full surge current ($I_s$). In view of its current-limiting effect, the described apparatus is often denoted in technical literature as an "$I_s$ limiter". A discussion of the multiple applications of $I_s$ limiters can be found, for example, in the paper entitled "Selective Switching in Extremely Short Times Using $I_s$ Limiters" located in *ETZ-A,* Vol. 81, No. 20/21 of Sept. 26, 1960, at pp. 741–744.

$I_s$ limiters basically comprise switches which are commonly used as circuit breakers. In power supply networks, it sometimes becomes necessary to reestablish the original connection of the power supply circuit after a successful opening of the circuit as a result of a short-circuit. If the short-circuit continues, as a rule, the final circuit opening must then take place. For this reason, switching mechanisms in high voltage networks are provided with devices for quick reconnection into the circuit. The quick reconnection into the circuit takes place through circuit breakers which are specially designed for this purpose.

An object of the present invention is to provide a curent-limiting device which is capable of using fast acting circuit breakers, such as $I_s$ limiters, to carry out quick reconnections into a power supply circuit, and preferably to provide entire quick reconnection cycles.

In order to achieve this objective in accordance with the present invention, at least one additional fast acting circuit breaker and a reconnect switch connected in series therewith are connected in parallel with the primary fast acting circuit breaker. In addition a device for establishing the readiness of the additional circuit breaker to explode or trip in response to a short-circuit can be connected in parallel with the additional circuit breaker.

The advantages of the present invention include the following points, among others: (a) extremely rapid response to short-circuits since the fast acting circuit breakers require typically less than 0.5 msec to limit and extinguish the short-circuit current; (b) the short-circuit current in alternating-current power lines can then be kept so small that electrical switching mechanisms and associated equipment no longer need to be rated for the full surge current. This is particularly of great economic significance in the construction of high voltage networks where increases in the breaking capacity of the circuit breakers are not required. In extreme cases, the exchange of all circuit breakers of a high voltage system would normally be necessary, but can be avoided by use of the current-limiting device of the present invention; and (c) by parallel connection of a number of fast acting circuit breakers with associated reconnect switches, quick reconnection in circuit cycles can be produced as desired.

Preferably, $SF_6$ safety grounding switches are used as short-circuiting devices. Such switches are described in the company document CH-A 352 336 D of the assignee of the present invention, BBC Aktiengesellschaft Brown, Boveri & Cie., Baden, Switzerland.

According to a further development of the present invention, the device for establishing the readiness of the additional circuit breaker for exploding or tripping includes auxiliary contacts on the reconnect switch which serve to activate the ignition device of the circuit breaker when closed. These auxiliary contacts close the tripping circuit of the ignition devices along with the actuation of the reconnect switch. A breaking of the explosive conductor accordingly takes place with the actuation of the reconnect switch when a corresponding tripping signal is simultaneously available through the auxiliary contacts. This feature offers the further advantage that no measures have to be undertaken to disconnect the auxiliary and main contacts of the reconnect switch from a source of potential when exchanging circuit breakers. The same holds true for the ignition devices of the circuit breakers, which are conventionally connected to the high voltage potential, due to economic reasons.

The ignition devices can be supplied with power by means of a pulse transformer. The pulse transformer can be connected to a short-circuit supervisory control device. The pulse transformer isolates the tripping circuit from the short-circuit detection circuit to inhibit misoperation.

Fast acting circuit breakers are manufactured at the present time for rated voltages up to approximately 36 kV. At higher rated voltages, a number of circuit breakers are connected in series, or a series connection of a number of explosive conductors can be connected in parallel with a fusible conductor. Circuit breakers of this type specified for higher rated voltages are described in the West German Pat. No. 1,141,015. Both of these types of circuit breakers can be used in the current-limiting device of the present invention having the capability for quick reconnection in circuit.

The number of switching units consisting of circuit breakers and reconnect switches connected in parallel with the first circuit breaker is determined in accordance with the required switching cycles. For a simple quick reconnection in circuit (ON-OFF-ON, or O-CO according to the IEC), it is sufficient to have a device with a first circuit breaker having a series connected circuit breaker and reconnect switch connected in parallel thereto. For each further switching cycle ON-OFF (C)), an additional switching unit consisting of a series connected circuit breaker and reconnect switch is required.

It is desirable to exchange "ignited" circuit breakers with unused circuit breakers during operation of the high voltage system. For this purpose, and further in accordance with the present invention, the circuit breakers or their associated reconnect switches are connected to the high voltage busbars by means of plug contact arrangements.

The invention is further described in detail below in conjunction with the accompanying drawings.

DETAILED DESCRIPTION

Figure 1:
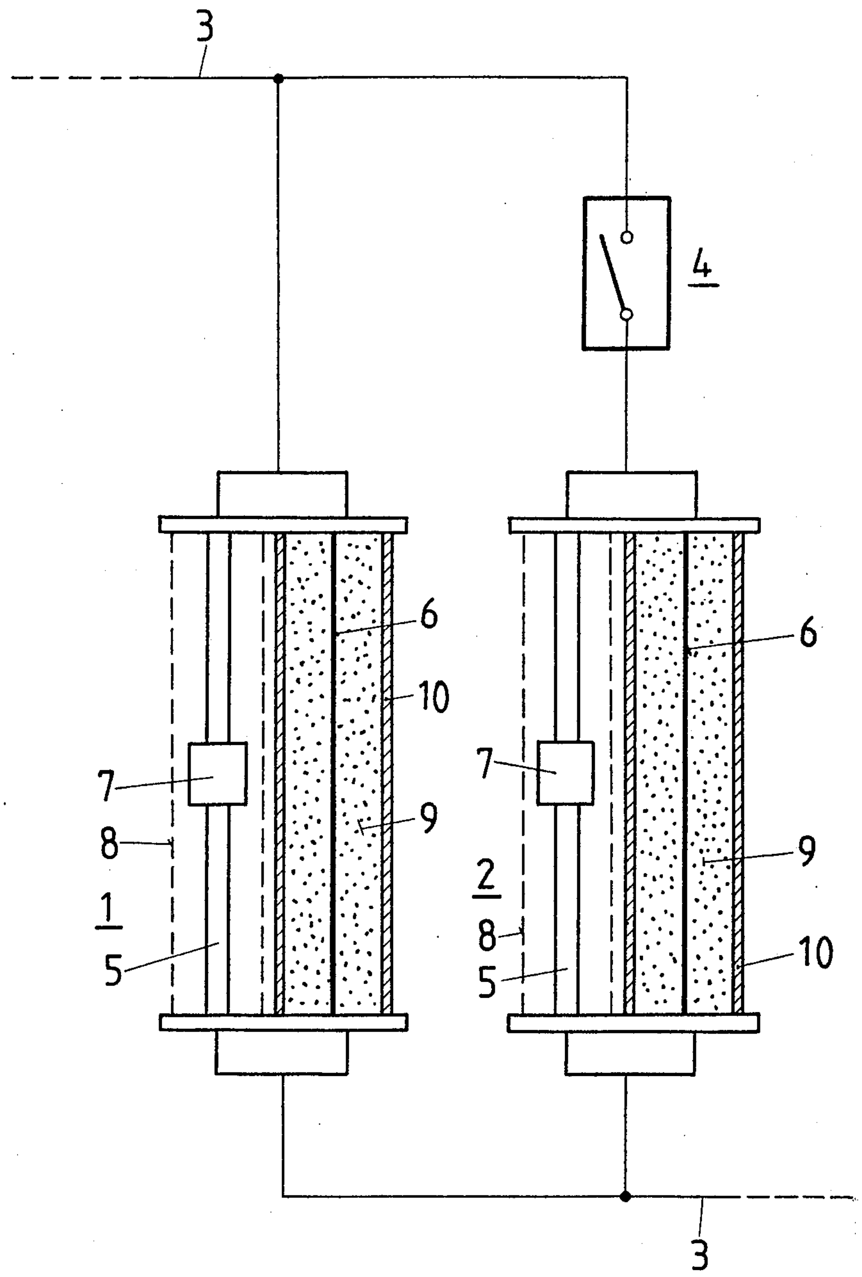
FIG. 1 is a schematic diagram of one form of construction of a current-limiting device with capability for quick reconnection in a circuit.

The schematic representation of FIG. 1 illustrates two fast acting circuit breakers 1, 2 each connected in series with a high voltage line 3 to be protected from short-circuit currents. The primary circuit breaker 1 is directly connected with the line 3, and the other circuit breaker 2 is connected with the line 3 through a reconnect switch 4. Each circuit breaker 1, 2 consists of one explosive conductor 5 and a fusible conductor 6 connected in parallel. The explosive conductor 5 is hollow and contains an explosive charge 7. A gas-permeable, nonelectrical conducting sheath 8, preferably a grid, is disposed around the explosive conductor 5. The fusible conductor 6 is housed in a casing 10 which can be filled, for example, with a powder 9 having a high quenching effect. Various known mechanical and electrical devices, such as an incandescent bridge igniter for example, can be used to ignite the explosive charge.

At the initiation of operation of the current device, the reconnect switch 4 is open and the current flows through the circuit breaker 1. In the event of a short-circuit, the explosive charge of the fusible conductor 5 is ignited by an ignition device which is responsive to the sharpness of the current increase. The explosive conductor 5 is broken by the explosion. The explosive gases appearing at this time cool the electric arc produced by the breaking of the explosive conductor very quickly and the electric arc is simultaneously lengthened. The arc voltage rises exceedingly quickly to a level required to commutate the current to the fusible conductor 6. The fusible conductor then quickly interrupts the short-circuit current to thereby limit the surge current to a small value. After the explosion, the two portions of the power line 3 are completely insulated from one another.

For reconnection, the circuit is closed by closing the reconnect switch 4 to connect the additional circuit breaker 2 into the circuit. If the short-circuit remains, it is quickly interrupted in the appropriate manner by igniting the explosive charge of the explosive conductor 5 in the second circuit breaker. Depending on the number of quick reconnections required in the circuit, further circuit breakers can be provided in series in the circuit.

It is important in the case of all quick reconnections into the circuit that, at the time of closing the current path through the respective circuit breaker, the latter be ready for explosion. The manner in which the readiness for explosion is produced will be explained in detail with reference to the switching arrangement shown in FIG. 2.

Figure 2:
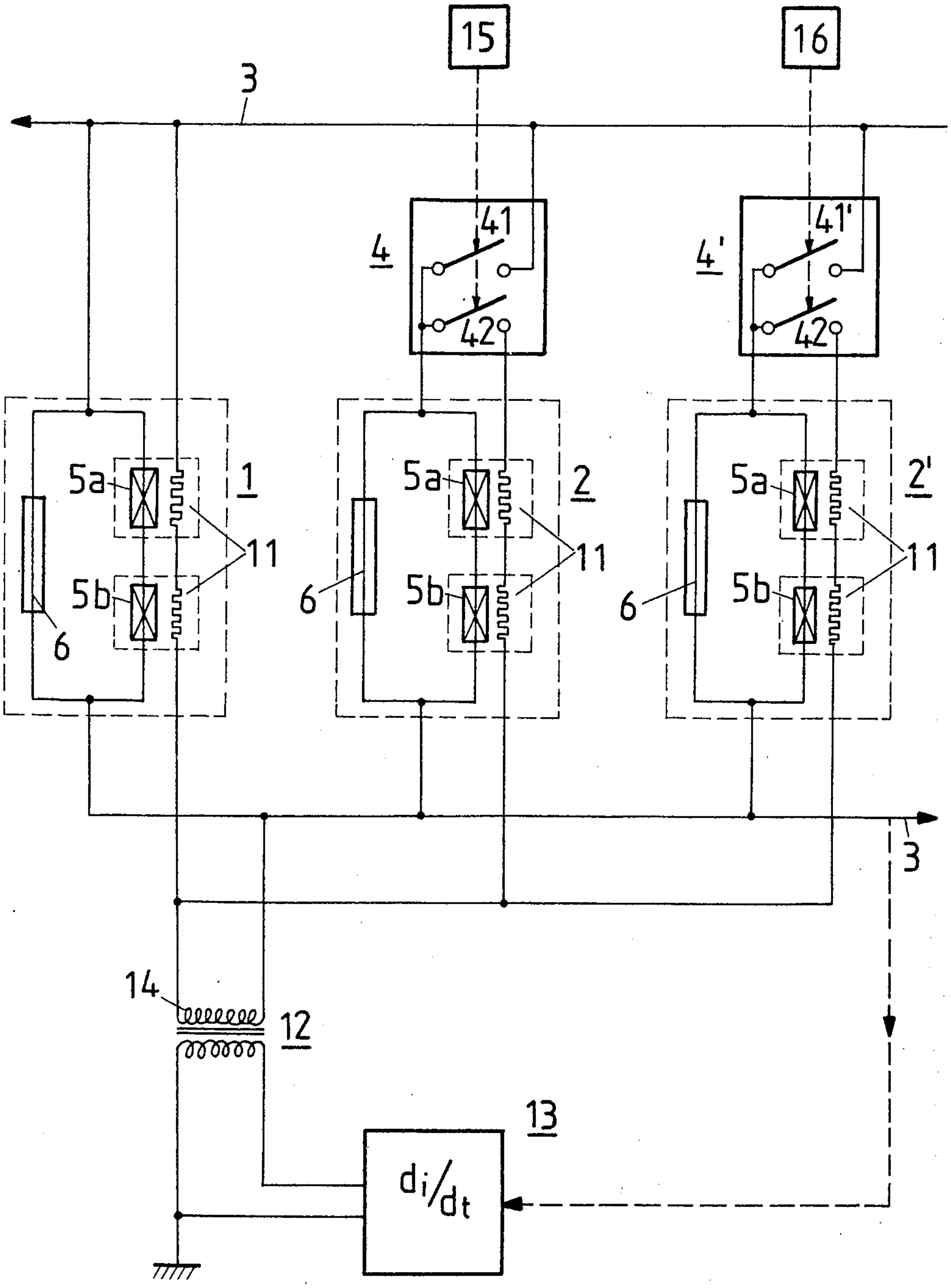
FIG. 2 is a schematic circuit diagram of an embodiment of a switching arrangement of the current-limiting device for a switching cycle of OFF-ON-OFF-ON (O-CO-CO) in accordance with the present invention.

Referring now to FIG. 2, circuit breakers 1, 2, 2' are connected in series with the high voltage line 3. The primary circuit breaker is connected directly with the line and the two other circuit breakers 2, 2' are connected with the line through the reconnect switches 4, 4', respectively. Both reconnect switches 4, 4' are designed with two poles and each feature a main contact 41, 41'and an auxiliary contact 42, 42'. The circuit breakers 1, 2, 2', basically corresponding with the design shown in FIG. 1, with a difference in that the explosive conductors arranged parallel to the fusible conductor 6 consist of the series connection of two individual explosive conductors **5*a*, 5*b*. An ignition device 11 is associated with each one of the individual explosive conductors, and acts on the explosive charge (not shown) of the respective individual explosive conductor. The ignition devices 11 of each circuit breaker are connected in series and are powered by means of a pulse transformer 12. This pulse transformer is connected to the output terminal of a short-circuit supervisory circuit 13. This supervisory circuit 13 is made of a well-known network protection circuit and generates an output signal when the current increase rate on the line 3** exceeds an adjustable limit value.

The ignition devices 11 of the first circuit breaker 1 are directly connected in parallel with the circuit breaker 1 through the secondary winding 14 of the pulse transformer 12. The ignition devices of the other circuit breakers 2, 2' are connectable to the power of line 3 through the auxiliary contacts 42, 42' of the reconnect switches 4, 4', respectively, and in parallel with the corresponding circuit breakers.

In the operation of the switching arrangement shown in FIG. 2, a short-circuit in the high voltage network is detected as a sudden increase in the rate of change of the current, di/dt, by the supervisory circuit 13. When a specified limit value, such as 10 kA/sec, for example, is exceeded, a tripping signal for circuit interruption is produced at the output terminal of the supervisory circuit 13. Since both the main and the auxiliary contacts of the reconnect switches 4, 4' are open, the tripping signal has an effect only on the ignition devices associated with the first circuit breaker 1.

If a reconnection into the circuit is to be undertaken, the circuit breaker 2 is connected into the main-current path through an actuator 15 of an suitable well-known construction which controls the reconnect switch 4. With the actuation of the reconnect switch 4, its auxiliary contact 42, as well as its main contact 41, is closed whereby the explosive charge in the circuit breaker 2 is ready for explosion. The auxiliary contact 42 should preferably close a few milliseconds earlier than the corresponding main contact 41 to ready the circuit breaker 2 for explosion prior to the time the main line circuit is applied to the circuit breaker. If the short circuit condition remains, a tripping signal will be passed to the pulse transformer by the supervisory circuit 13. The desired interruption of the line current will be almost simultaneous with the closure of the reconnect switch 4.

For a switching cycle comprising "OFF-ON-OFF-ON-OFF" (O-CO-CO according to the IEC), the reconnect switch 4' is closed by means of its actuator 16 after the operation of the circuit breaker 2. In this case, the readiness of the circuit breaker 2' for explosion also takes place through the auxiliary contact 42'. If the short-circuit condition continues to remain, the final current interruption will take place with the actuation of the circuit breaker 2'.

Figure 3:
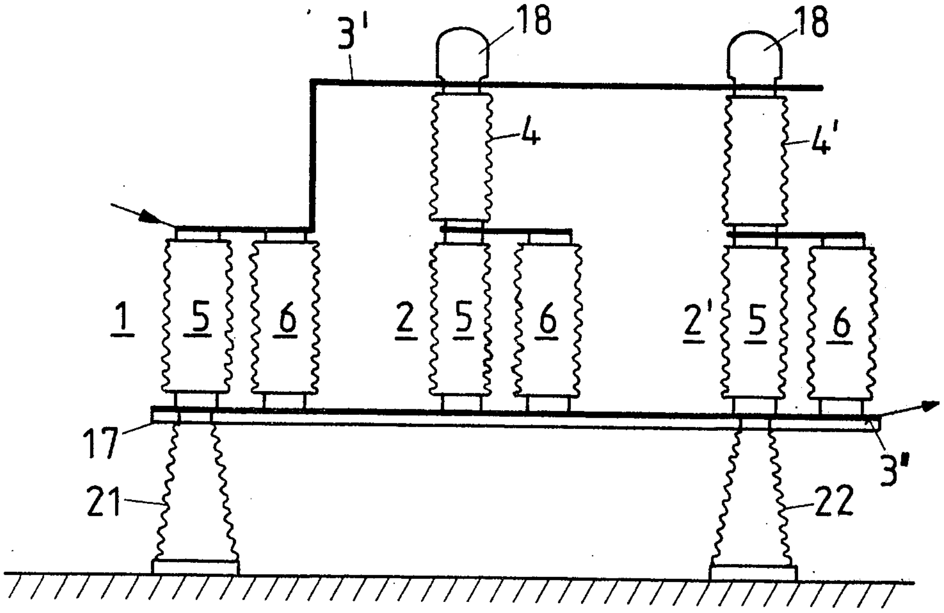
FIG. 3 is a front view of a high voltage switching mechanism showing the design of one form of construction of a current-limiting device according to the present invention.
Figure 4:
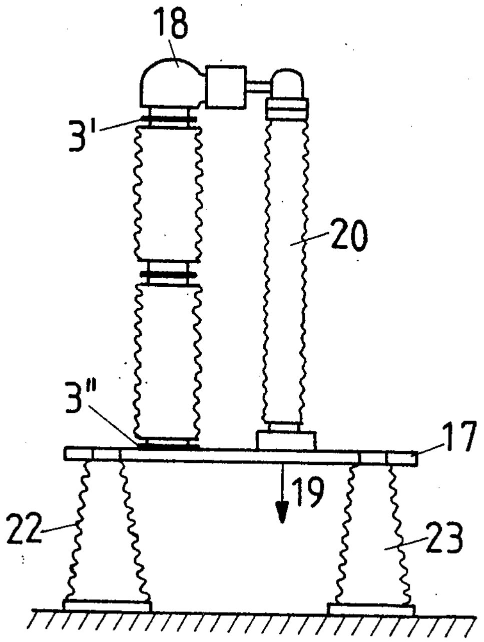
FIG. 4 is a side view of the system shown in FIG. 3.

Referring now to the construction of a high voltage switching mechanism shown in FIGS. 3 and 4, the circuit breakers 1, 2, 2' consisting of explosive conductors 5 and fusible conductors 6 are arranged on a frame 17. The explosive conductors and the fusible conductors are each housed in a separate ceramic housing in a manner corresponding to the prevailing practice. The reconnect switches 4, 4' are mounted respectively on the explosive conductor housings. The resonent switches 4, 4' are preferably $SF_6$ enclosed safety grounding switches. The switch actuators are arranged in the overhead portions 18, 18' of the reconnect switches and are in operative connection with an actuator pushrod (shown by arrow 19). The actuator pushrod is housed within a ceramic insulator 20.

The frame 17 is supported on insulator columns 21, 22, 23, and the pulse transformer can be housed inside one of the insulator columns. The electrical connection between the individual circuit breakers takes place at their output terminals through the output busbar 3''. At the input terminals, the first circuit breaker 1 is connected with the reconnect switches 4 and 4' through the input busbar 3'.

Operating conditions generally require that unused circuit breakers be substituted for "ignited" circuit breakers while the power supply network is operating. The advantage of the present invention in facilitating this operation is shown in FIG. 5.

Figure 5:
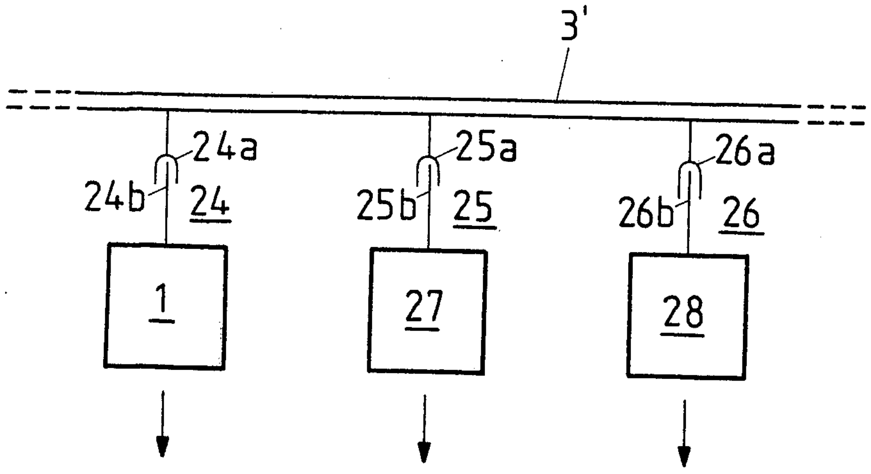
FIG. 5 is a block diagram of a high voltage switching mechanism with exchangeable circuit breakers or reconnect switches.

The high voltage line 3 is constructed as a busbar 3' and is provided with contact jacks *24a*, *25a*, *26a*, only the upper jacks being visible in FIG. 5. The circuit breaker 1 and the circuit breakers 2 and 2' constructed as switching units 27 and 28 together with reconnect switches 4 and 4', respectively, are provided with corresponding contact plugs *24b*, *25b*, *26b* which form contact segments 24, 25, 26 together with contact parts *24a*, *25a*, *26a*, and are connected to the busbar 3'. The plug-in arrangement can also be made such that only the circuit breakers are connected to the busbars by means of a contact arrangement 24, 25, 26 through the reconnect switches which are fixedly connected to the busbar.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. A current limiting device for high voltage switching mechanisms, comprising:

first and second high voltage busbars having contact jacks;

a first fast-acting circuit breaker having an explosive conductor containing an explosive charge which breaks the conductor when actuated and a fusible conductor connected in parallel with the explosive conductor through which current is commutated and interrupted when the explosive conductor is broken, said first circuit breaker also having contact plugs to thereby enable said first circuit breaker to be readily connected to and disconnected from said busbars while current is flowing through them; and a switching unit including a second fast-acting circuit breaker having an explosive conductor with an explosive charge and a fusible conductor, a reconnect switch having main contacts for supplying current to said second circuit breaker and auxiliary contacts for supplying power to an ignition device for the explosive charge of said second circuit breaker prior to closure of said main contacts, and contact plugs to thereby enable said switching unit to be readily connected to and disconnected from said busbars while current is flowing through them.

2. The current limiting device of claim 1 further including a supervisory circuit for detecting the rate of change of current in said current carrying line, and a pulse transformer controlled by said supervisory circuit to supply actuating pulses to said ignition device.

3. The current limiting device of claim 1, wherein each of said first and second circuit breakers includes a plurality of individual explosive conductors connected in series and an ignition device associated with each explosive conductor.

4. The current limiting device of claim 1, wherein each of said first and second circuit breakers includes a plurality of individual circuit breakers connected in series with each other.

* * * * *